Patented July 21, 1925.

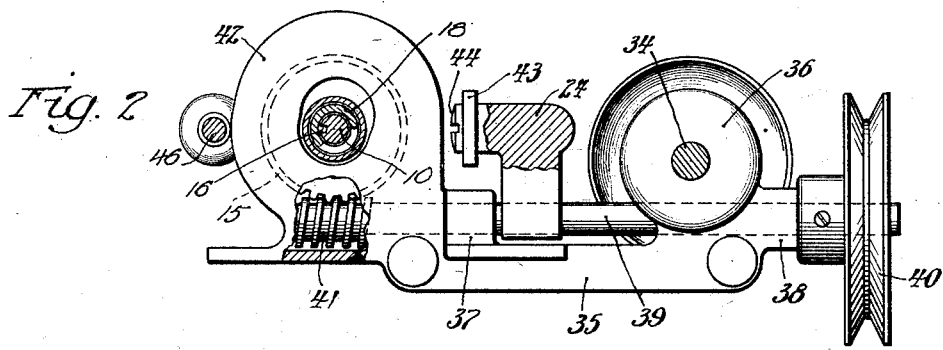

1,546,580

UNITED STATES PATENT OFFICE.

FRANKLIN HARDINGE, OF CHICAGO, ILLINOIS, ASSIGNOR TO HARDINGE BROTHERS, INC., OF CHICAGO, ILLINOIS, A CORPORATION OF ILLINOIS.

VALVE.

Application filed March 15, 1922. Serial No. 544,002.

*To all whom it may concern:*

Be it known that I, FRANKLIN HARDINGE, a citizen of the United States, and resident of Chicago, in the county of Cook and State of Illinois, have invented a certain new and useful Improvement in Valves, of which the following is a full, clear, concise, and exact description, reference being had to the accompanying drawings, forming a part of this specification.

My invention relates to improvements in valves, and is particularly concerned with the provision of a valve adapted to control excessively minute flow of fluids, and particularly fluids which may have in suspension a certain amount of dirt or other sediment.

While my invention is not in any sense limited to that use, it is particularly designed for use in connection with fuel oil burners. Heretofore considerable difficulty has been experienced in burning fuel oils, by which I mean the petroleum residuum commercially known as fuel oil, and some of the still heavier petroleum crude oil or residuum oils, when it was attempted to burn these fuel oils at a comparatively low rate. This difficulty has been occasioned, not only because it is difficult to provide a valve which will continuously supply fuel oil under controllable conditions, without variations in flow, but also on account of the dirt and other impurities contained in these fuel oils which have a tendency rapidly to clog the valve and thus shut off the supply of fuel oil.

It has heretofore been proposed to provide a regulating valve suitable for the above purpose comprising a valve seat and a valve, one of which is movable or rotatable relatively to the other without disturbing the adjustment of the valve, and, while such valves have been quite successful in constantly maintaining a small rate of flow, an object of my invention is to provide a valve which is capable of controlling the rate of flow of these fuel oils, or other fluids, so that the fluids will continuously pass through the valve at a rate less than has heretofore been possible.

Another object of my invention is to provide a valve of the character described which quickly and readily clears itself of sediment or other impurity carried by the fluid passing through the valve.

A still further object is to provide a valve which can be easily and quickly adjusted to give any desired portage.

And finally, another object is to provide a valve of the character described which is simple in construction, easy to manufacture and one which will run continuously for long periods of time without requiring attention of any kind whatever.

The above and other objects are accomplished by means of the construction illustrated in the accompanying drawings, in which—

Figure 1 is a side elevation of my improved valve, portions thereof being broken away for the purpose of better illustration; and Figure 2 is a transverse section taken on the line 1—1 of Figure 1, certain portions of this view being broken away.

Referring to the drawings wherein I have illustrated one embodiment of my invention, I have shown a chambered body member 5, which is provided with an inlet port (not shown) and an outlet port 6. The outlet port 6 is provided with a tubular valve seat 7, which is held in place by the hollow threaded plug 8. Opposite the valve seat 7 is a hollow plug 9, which provides a bearing for the valve spindle 10. Leakage along the valve spindle 10 is prevented by a suitable gasket 11, held in place by the bushing 12 and the follower 13, which is threaded upon the exteriorly threaded end portion 14 of the plug 9.

A worm wheel 15 is splined to the upper end of the valve spindle 10 by the feather 16, and rests upon a fibre washer 17 which is supported by the upper end of the follower 13. A compression spring 18 surrounds the upper end of the valve spindle 10 with its lower end abutting against the top of the worm wheel 15 and its upper end abutting against the flange 19 of the sleeve 20 which surrounds the compression spring and which is held against the tension of the spring 18 by means of the projecting portions of the split washer 21, the inner edge of which is received in a suitable annular groove 22 in the extreme upper end of the valve spindle. The spring 18 tends constantly to urge the valve spindle 10 in an upward direction.

The body member 5 is provided with a lateral boss or projection 23, to which is secured the post 24 having the laterally projecting bracket 25. A micrometer screw 26 is mounted in the bracket 25 and, at its lower or inner end, carries a hardened steel ball 27, which bears upon the upper end of the valve spindle 10, which is also preferably hardened to resist wear. The upper end of the screw 26 is provided with a suitable knurled handle 28 and a disc 29 which is provided with a micrometer scale 30 adapted to co-act with the pointer 31 to indicate the extent to which the valve has been opened. The post 24 is provided with a second bracket 32 through which the bolt 34 extends. A bracket 35, comprising the hub bearing 36, is pivotally mounted upon the lower end of the bolt 34. This bracket comprises the bearings 37 and 38 for the shaft 39, the outer end of which is provided with a grooved pulley 40 whereby it can be rotated, and the inner end of which is provided with a worm 41 adapted to be brought into or out of meshing relation with the worm wheel 15. The housing 42, forming a part of the bracket 35, incloses the worm 41 and the worm wheel 15.

A latch 43, pivotally secured to the inner side of the post 24 by means of the screw 44, is provided with an opening for receiving the lug 45 extending upwardly from the bracket 35 (see Fig. 1) to hold the worm 41 in mesh with the worm wheel 15.

A brace rod 46 connects the outer end of the bracket 25 with a lug 47 projecting from the body member 5, and prevents the bracket 25 from springing away from the body member under the tension of the spring 18.

With the exception of the tubular valve seat 7 referred to above, I do not claim as my invention the remaining portions of the valve thus far described which are also illustrated and described more fully in a patent of Franklin Hardinge, No. 1,470,974, granted October 16, 1923.

In addition to providing a tubular valve seat 7, my invention contemplates providing the lower end of the valve spindle 10 with a longitudinally extending bore 48 which communicates with the discharge port 6 of the body member, and which also communicates with the inlet port of the body member by means of a small radially or laterally extending opening 49 passing through the wall of the bore 48.

The valve seat 7, not only acts as a valve seat, but also acts as a bearing for the lower end of the valve spindle 10. It should be noticed that the inner edge of the tubular valve seat 7 is beveled, as shown at 50.

I prefer to locate the opening 49 so that, when the micrometer screw 26 has been screwed in to the inner limit of its movement, which is determined by the engagement of the lug 51 carried by the disc 29 and the lug 52 carried by the bracket 25, the upper edge of the opening 49 is positioned below the upper edge of the tubular valve seat 7 a distance which will require at least one or two complete turns of the screw 26 in the opposite direction before the upper side of the opening 49 is even with the upper edge of the valve seat 7. I prefer this construction, first, because it insures a more complete seal between the valve seat and the valve spindle, and, second, because, if any wear of either the valve seat or the spindle takes place adjacent the upper edge of the valve seat, the opening 49 will be moved far enough below this worn zone to cause complete cessation of flow of the fluid when the screw 26 has been turned to its inner limit.

In the operation of the valve just described, the pulley 40 is connected by means of a suitable belt with any source of power so that the shaft 39 is rotated at a comparatively slow rate. This rotation is communicated to the valve spindle 10 through the worm 41 and the worm wheel 15, so that the valve spindle 10 is continuously rotated. This movement or rotation of the valve spindle 10 does not in any way affect the adjustment of the valve spindle 10 and the valve seat 7 relatively to each other. The fluid enters the chamber in the body member 5 through the inlet port (not shown), then passes through the small opening 49 into the bore 48 of the valve spindle and from thence into the discharge port or bore 6 of the body member, from whence it can be carried to any desired location by a pipe 53, or in any other suitable manner.

While there may be some tendency for dirt or sediment carried by the fluid passing through the valve to collect on the beveled edge 50 of the valve seat adjacent the opening 49, the position of this opening is continuously changing and the friction of the valve spindle on the collected sediment is apparently sufficient to cause it to be dislodged from the beveled edge 50 and to drop to the bottom of the chamber in the body member. The sediment thus collected can be flushed out through the opening 54 which is closed by the screw 55.

By the use of the above valve, I have found it possible to provide a continuous flow of commercial fuel oil which has previously been passed through a filter of one hundred mesh, even when the rate of flow is as small as one-half gallon per hour, the fuel oil being under pressure of fifteen pounds per square inch.

While I have described my valve as being particularly useful in connection with controlling the flow of fuel oil to fuel oil burners, it is to be understood that my invention is not limited to this adapation, nor is it limited to the details of construction shown in the embodiment of my invention described above, but is capable of other adaptations and modifications within the scope of the appended claims.

Having thus described my invention, what I claim is:

1. A valve comprising a body member having inlet and outlet ports, a tubular shaped valve seat intermediate said ports, one end of said valve seat lying in a plane extending at right angles to the axis of said valve seat a spindle projecting through one wall of said body member, with its inner end extending through said valve seat, said last-mentioned end being provided with a longitudinally extending bore and a laterally extending opening, forming means for establishing communication between said outlet and said inlet bores, means on the outer end of said spindle whereby it can be rotated, and means for longitudinally adjusting said spindle to cause said end of said valve seat to uncover more or less of said opening.

2. A valve comprising a body member having inlet and outlet ports, a valve seat intermediate said ports having a complete circular margin, a tubular member projecting through said valve seat and having an opening in its wall, the bore of said tube and said opening forming means for establishing communication between said inlet and said outlet ports, means for longitudinally adjusting said tubular member to cause said circular margin to uncover more or less of said opening, and means for rotating said tubular member without disturbing the longitudinal adjustment of said member.

3. A valve comprising a body member having a bore extending therethrough, one portion of said bore being of a greater diameter than the other, to form a complete circular shoulder at a normal to the axis of said bore, a member rotatably mounted in the smaller portion of said bore and having a longitudinally extending channel formed therein ending in a laterally directed opening for establishing communication between the two portions of said bore, means whereby said member can be rotated without disturbing its longitudinal position, and means for longitudinally adjusting said member to cause said shoulder to open and close the laterally directed opening of said channel.

4. A valve comprising a body member having a bore formed therein, said bore having an enlarged portion forming a complete circular shoulder, a member rotatably mounted in said smaller portion of said bore and provided with a passageway open at said shoulder, means for longitudinally adjusting said member to cause said shoulder to cover or uncover a greater or less portion of the end of said passageway, and means for rotating said member without varying or interrupting the uncovered portion of the said end of said passageway.

5. A valve comprising a pair of concentric members, one having an opening of comparatively large area, the second member having a port of comparatively small area, means for rotating one of said members continuously relatively to the other, the opening of said first member being defined by a complete circular shoulder affording a continuous communication between the opening and the port without disturbing the portage thereof, and means by which one of said members can be moved relatively to the other to cause said shoulder to vary the said portage.

6. A valve comprising two relatively movable members, means for rotating one of the members relatively to the other, an opening in one of said members and a port in the other of said members for communicating therewith to establish the restricted orifice of the valve, said opening being formed to provide a continuous portage for said port in its rotation, and means for relatively moving said members longitudinally to vary the amount of said portage.

In witness whereof, I hereunto subscribe my name this 13th day of March, 1922.

FRANKLIN HARDINGE.

Witnesses:
 EDNA V. GUSTAFSON,
 EMILE BOURGEOIS.